(12) United States Patent
Pettitt et al.

(10) Patent No.: US 8,561,489 B2
(45) Date of Patent: Oct. 22, 2013

(54) AIRCRAFT SKIN PANEL WITH ULTRASONIC GAUGE

(75) Inventors: Bryn Pettitt, Bristol (GB); James Beale, Bristol (GB)

(73) Assignee: Airbus Operations Limited, Bristol (GB)

( * ) Notice: Subject to any disclaimer, the term of this patent is extended or adjusted under 35 U.S.C. 154(b) by 399 days.

(21) Appl. No.: 13/120,021

(22) PCT Filed: Sep. 22, 2009

(86) PCT No.: PCT/GB2009/051229
§ 371 (c)(1),
(2), (4) Date: Mar. 21, 2011

(87) PCT Pub. No.: WO2010/038052
PCT Pub. Date: Apr. 8, 2010

(65) Prior Publication Data
US 2011/0168845 A1     Jul. 14, 2011

(30) Foreign Application Priority Data
Oct. 1, 2008 (GB) .................................. 0817921.0

(51) Int. Cl.
*G01D 21/00* (2006.01)
*G01F 23/00* (2006.01)
(52) U.S. Cl.
USPC ....................................... 73/866.5; 73/290 V
(58) Field of Classification Search
USPC ............................................ 73/290 V, 866.5
See application file for complete search history.

(56) References Cited

U.S. PATENT DOCUMENTS

| 4,079,903 | A | | 3/1978 | Ashton et al. |
| 4,530,443 | A | * | 7/1985 | Gorges ........................... 220/327 |
| 4,770,038 | A | | 9/1988 | Zuckerwar et al. |
| 5,315,563 | A | * | 5/1994 | Lichtenfels et al. ............ 367/99 |
| 5,379,658 | A | | 1/1995 | Lichtenfels, II et al. |
| 6,536,275 | B1 | | 3/2003 | Durkee et al. |
| 6,672,152 | B2 | * | 1/2004 | Rouse et al. ................ 73/170.02 |
| 2002/0153159 | A1 | * | 10/2002 | Carpenter ................... 174/117 F |

FOREIGN PATENT DOCUMENTS

| DE | 102005018824 | 4/2005 |
| EP | 1749742 | 2/2007 |
| WO | 2005015134 | 2/2005 |

OTHER PUBLICATIONS

UK Search Report for GB0817921.0 mailed Dec. 2, 2008.
International Search Report for PCT/GB2009/051229 mailed Jan. 28, 2010.

* cited by examiner

*Primary Examiner* — Hezron E Williams
*Assistant Examiner* — Nathaniel Kolb
(74) *Attorney, Agent, or Firm* — Lowe Hauptman & Ham, LLP

(57) ABSTRACT

An aircraft panel which is a wall of a fluid tank when in use, the panel comprising a skin layer with an outer surface which is an aerodynamic surface of an aircraft when in use; a hole in the skin layer; an ultrasonic gauge which is mounted to an inner surface of the skin layer adjacent to the hole in the skin layer; and an access panel which covers the hole and can be removed to gain access to the gauge.

19 Claims, 6 Drawing Sheets

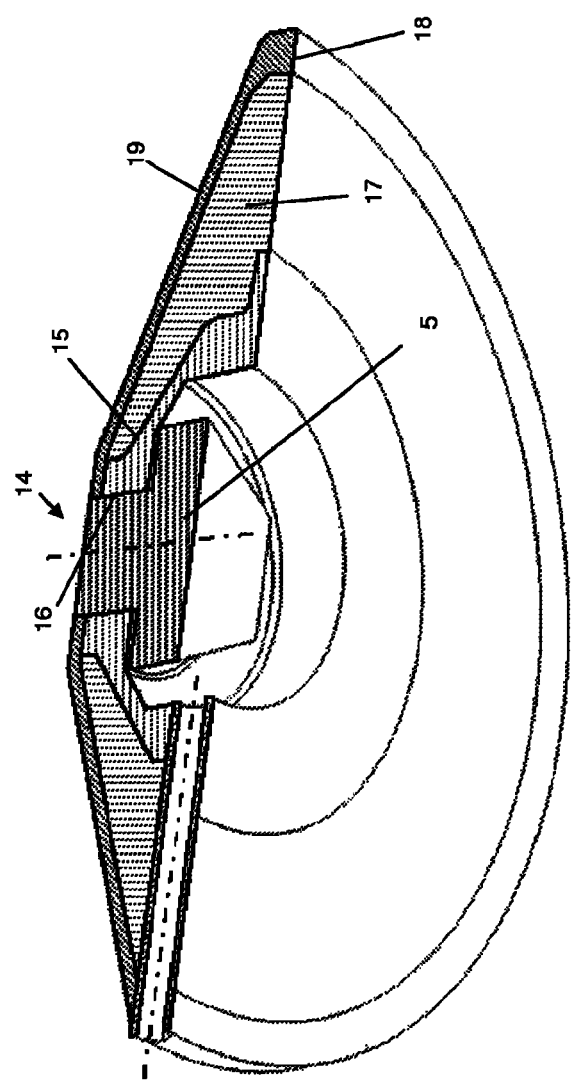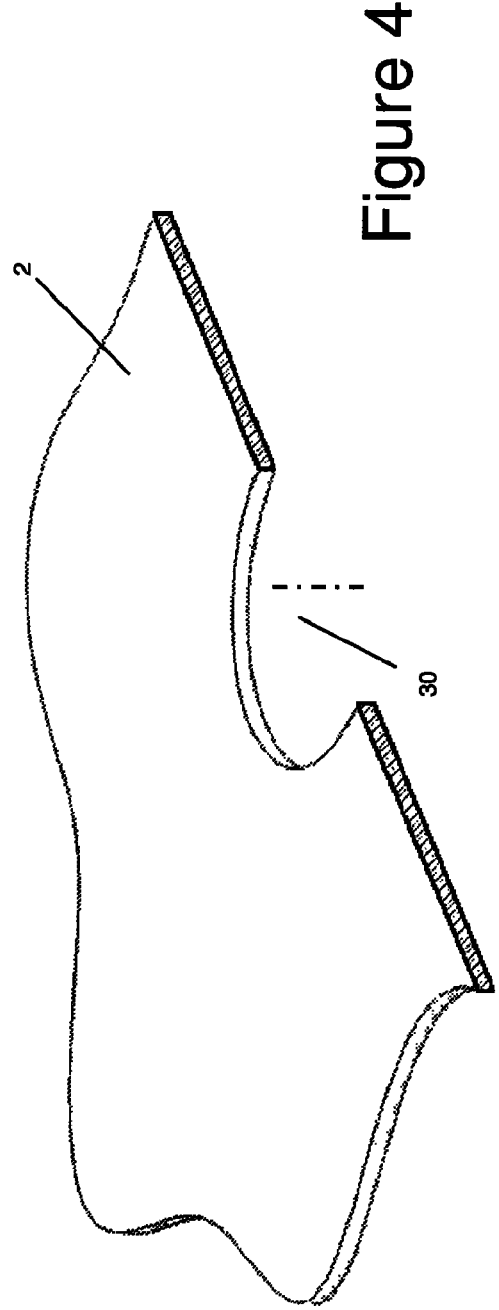

US 8,561,489 B2

AIRCRAFT SKIN PANEL WITH ULTRASONIC GAUGE

FIELD OF THE INVENTION

The present invention relates to an aircraft skin panel with an ultrasonic gauge, and a method of manufacturing such a panel.

BACKGROUND OF THE INVENTION

An ultrasonic fuel-gauging system for an aircraft is described in WO 2005/015134. An ultrasonic transducer is attached to a carrier tape which is coupled to an internal surface of the wall of the fuel tank. A problem with such internally mounted systems is that the wires and transducer, being electrical components, can potentially ignite fuel. Another problem with such systems is that the tank must be entered by personnel in order to repair or inspect the transducer. This can be time consuming and difficult.

Both of these problems could be solved by externally mounting the transducer as in U.S. Pat. No. 5,761,955. However this is unacceptable in the case of an aircraft skin panel because the transducer will increase drag.

SUMMARY OF THE INVENTION

A first aspect of the invention provides an aircraft panel which is a wall of a fluid tank when in use, the panel comprising a skin layer with an outer surface which is an aerodynamic surface of an aircraft when in use; a hole in the skin layer; an ultrasonic gauge; and an access panel which fills the hole and can be removed to gain access to the gauge from outside the tank.

The provision of an access panel in the skin layer enables the gauge to be installed, inspected and/or repaired from outside the tank. Preferably the access panel is substantially flush with the outer surface of the skin panel in order to minimise drag.

The panel may have a monolithic construction with just a single layer. Alternatively the panel may have a sandwich construction with an inner layer and a core having a mass density lower than the inner layer and the skin layer, the core being positioned between the inner layer and the skin layer. This has the advantage that the gauge and optionally also the signal wire can be shielded from fuel or fuel vapour by the inner layer. The sandwich skin panel can be assembled by placing the core and the gauge on a first one of the layers, and then laying the other layer onto the core and the gauge.

Preferably the ultrasonic gauge engages an inner surface of the skin layer. The gauge may also be bonded to the skin layer.

The ultrasonic gauge may consist of an ultrasonic transducer only, or a gauge assembly comprising a transducer assembled with one or more fittings. The gauge assembly may have an angled surface which engages the inner layer, and the inner layer forms a ramp where it engages the angled surface. Typically the transducer has a flat surface which engages the inner layer.

The access panel may be mounted to the skin layer. However this presents the problem that holes must be formed in the skin layer, weakening the skin layer and increasing drag. Therefore more preferably the access panel is mounted to the ultrasonic gauge, typically by one or more removable fasteners.

The fluid tank typically is a fuel tank, although alternative fluids may be monitored by the transducer such as water, or fluid for hydraulic actuators. Typically the gauge is used to monitor the level of the fluid in the tank.

BRIEF DESCRIPTION OF THE DRAWINGS

Embodiments of the invention will now be described with reference to the accompanying drawings, in which:

FIG. 3 is a perspective sectional view of the gauge assembly;

FIGS. 4-7 are perspective sectional views showing a series of steps in the manufacture of the panel;

DETAILED DESCRIPTION OF EMBODIMENT(S)

Figure 1:
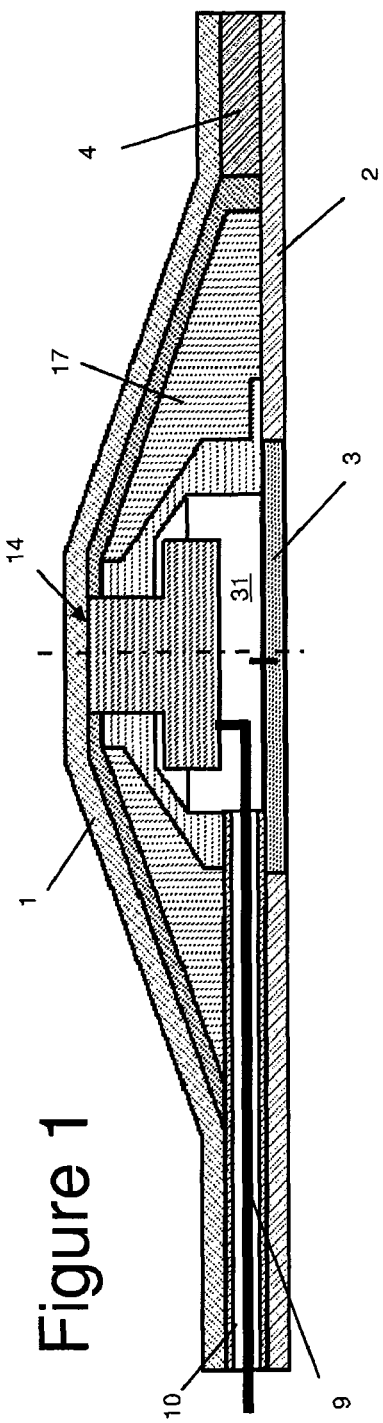
FIG. 1 is a sectional view through an aircraft skin panel with a sandwich construction.

FIG. 1 is a sectional view through an aircraft skin panel. The panel has a so-called "sandwich" construction with a composite inner layer 1; a composite skin layer 2; an access panel 3; and a low density foam core 4.

Also positioned between the inner and skin layers of the skin panel are an ultrasonic gauge assembly 14; a signal wire 9; and a wire conduit 10. The signal wire 9 is shown in FIG. 1 but omitted from the other Figures.

Figure 2:
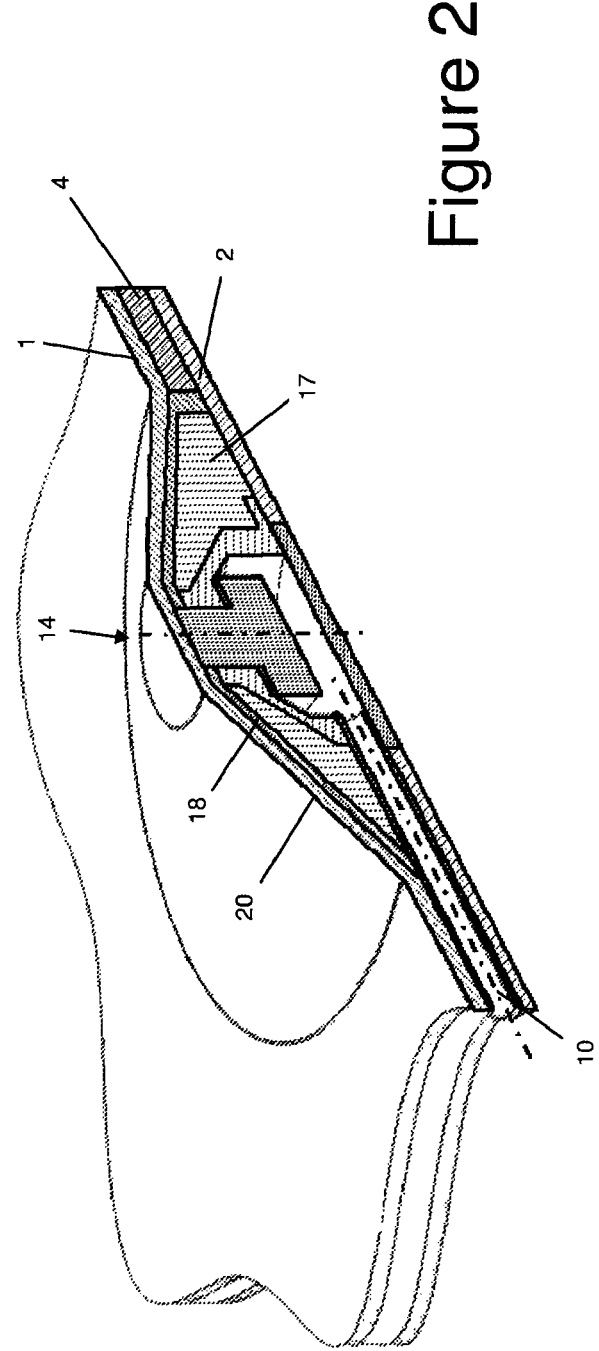
FIG. 2 is a perspective sectional view of the panel.

The gauge assembly 14 shown in FIG. 3 comprises a transducer 5 (to which the signal wire 9 is attached); an inner fitting 15 with a threaded bore 16; a foam filler 17; and an outer fitting 18. The outer fitting 18 has a frustoconical surface 19 which engages the inner layer 1. The inner layer 1 forms a corresponding frustoconical ramp 20 where it engages the frustoconical surface of the outer fitting 18 as can be seen most clearly in FIG. 2. The transducer 5 has an outer thread which forms a threaded connection with the bore 16 in the inner fitting.

FIGS. 4-7 are perspective sectional views showing a series of steps in the manufacture of the panel.

The composite skin layer 2 comprises a stack of composite "prepreg" plies—each ply in the stack comprising a set of unidirectional carbon fibres impregnated with an epoxy resin. Each ply may be laid manually, or as a series of tape strips by an automated tape laying machine.

Figure 5:
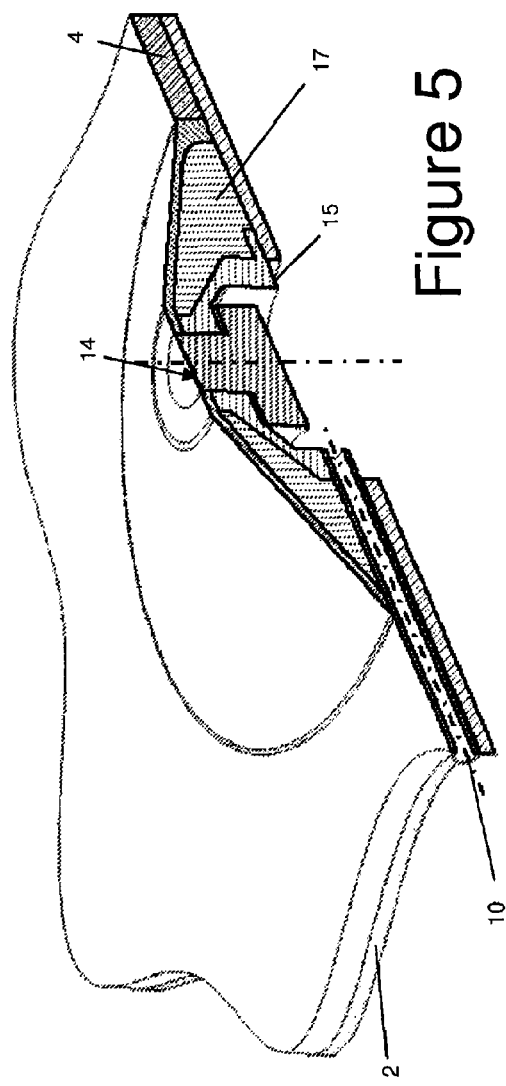

The skin layer 2 is cut with a hole 30 as shown in FIG. 4. Next the gauge assembly 14, wire conduit 10 and core 4 are placed on the skin layer as shown in FIG. 5. The gauge assembly 14 is fitted into a circular hole in the core, and the wire conduit 10 is fitted into an elongated hole in the core. The gauge assembly 14 and wire conduit 10 are received in their respective holes in the core 4 as a push fit so that they engage the core on both sides.

Figure 6:
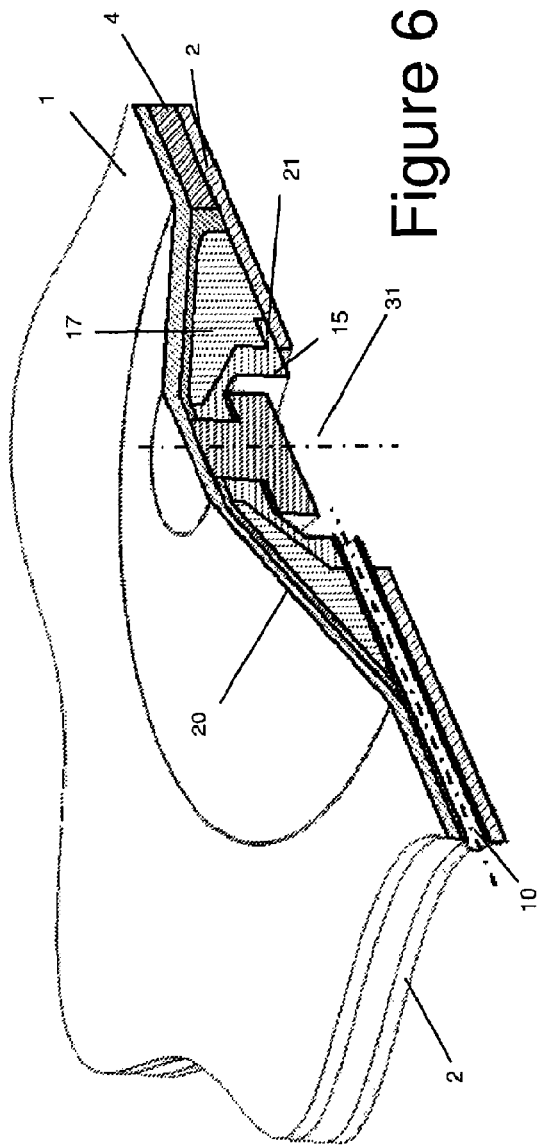
Figure 7:
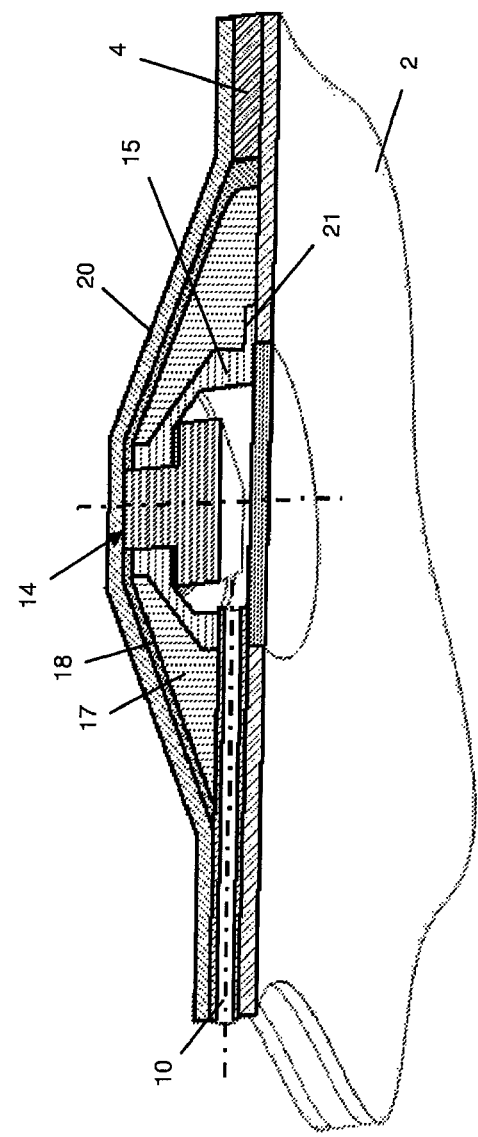

Next the inner layer 1 is laid onto the gauge assembly 14, wire conduit 10 and core 4 as shown in FIG. 6. The inner layer 1 has the same construction as the skin layer 2: that is, it comprises a stack of composite "prepreg" plies—each ply in the stack comprising a set of unidirectional carbon fibres impregnated with an epoxy resin. Each ply may be laid manually, or as a series of tape strips by an automated tape laying machine.

The foam core 4 has a lower mass density than the composite inner layer 1 and the composite skin layer 2.

The wire conduit 10 has the same thickness as the core 4, so it engages and supports both the inner layer 1 and the outer skin 2. The low angle of the ramp enables the inner layer 1 to be laid relatively easily.

Next, the signal wire 9 is threaded along the wire conduit 10 until its free end enters the open chamber 31 underneath the transducer. The free end of the signal wire is then connected to the transducer—access for this operation being provided by the open hole 30 in the skin layer. The signal wire 9 may be connected to the transducer by screw terminals, crimping or any other suitable method.

Finally the hole 30 is closed by screwing the access panel 3 to the inner fitting 15 by a series of screws (not shown) around its periphery. Note that by screwing the access panel 3 to the inner fitting 15, no fasteners need pass through the skin 2. The access panel 3 and gauge assembly are prevented from falling out of the hole 30 by engagement of a flange 21 of the inner fitting 15 against the inner face of the skin layer 2 around the periphery of the hole 30 The access panel 4 can be unscrewed later if needed to gain access to the transducer for repair or inspection purposes.

Figure 8:
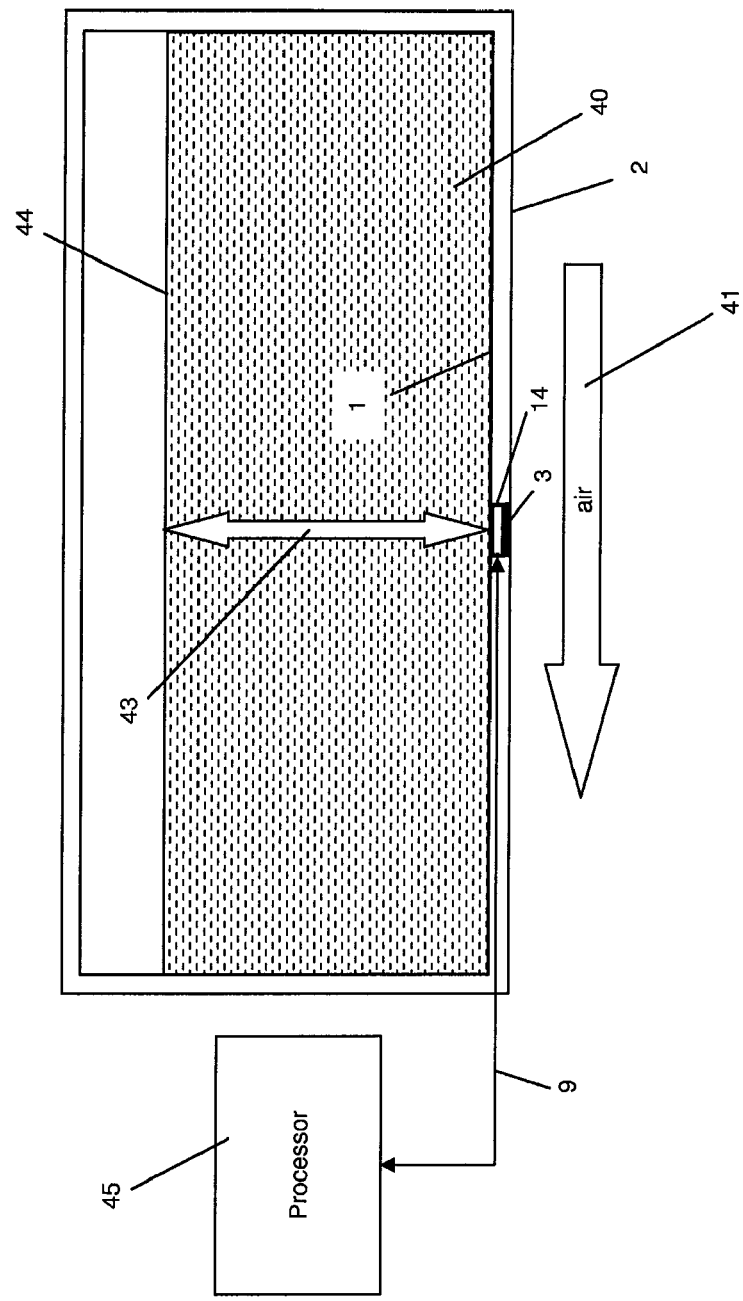
FIG. 8 is a schematic view of a fuel tank incorporating the panel.

FIG. 8 is a schematic view of an aircraft fuel tank incorporating the skin panel of FIGS. 1 to 7. When in use as shown in FIG. 8, the inner layer 1 is a wall of the fuel tank containing fuel 40 and the skin layer 2 and access panel 3 form an aerodynamic surface of the aircraft exposed to air flow 41. Thus it is desirable that the inner layer 1 is unbroken (to prevent fuel leaks), and the skin layer 2 and access panel 3 are smooth (in order to minimise drag).

The transducer transmits ultrasound 43 into the fuel. The ultrasound is reflected from the fuel/air interface 44 to generate an ultrasonic echo which is received at the transducer and transmitted via the signal wire 9 to a processor 45 at a remote location such as the fuselage of the aircraft. The processor 45 then deduces the fuel level based on the time of arrival of the ultrasonic echo. Specifically, for each fuel tank there is a direct correlation between the time of flight of the ultrasound and the height of fuel held in the tank, assuming that the transducer is at a known measurement position on the tank.

Figure 9:
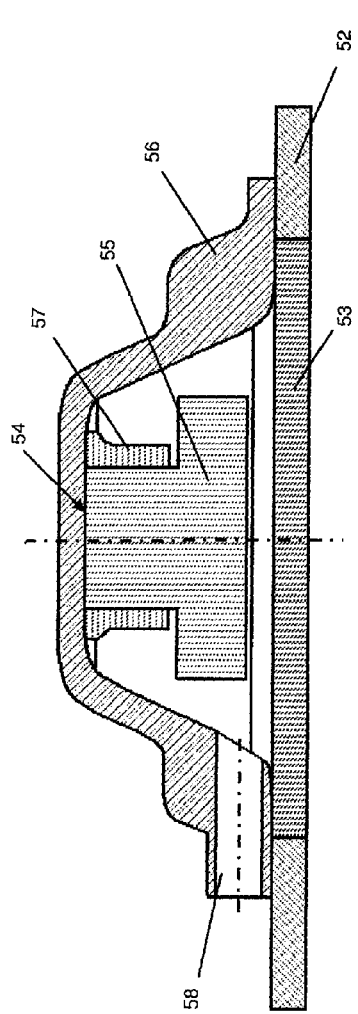
FIGS. 9 and 10 are perspective sectional views of an aircraft skin panel with a monolithic construction.
Figure 10:
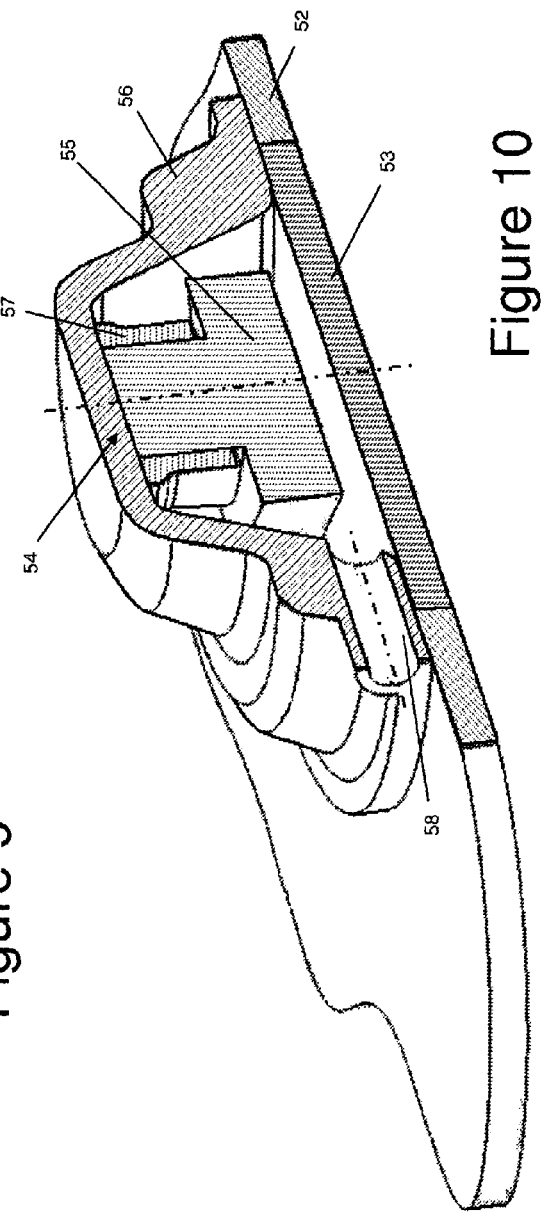

FIGS. 9 and 10 are perspective sectional views of an aircraft skin panel according to a second embodiment of the invention with a monolithic construction. The panel has a single composite skin layer 52; an access panel 53; and an ultrasonic gauge assembly 54.

The gauge assembly 54 comprises a transducer 55 to which a signal wire (not shown) is attached; and a "flower pot" housing 56 with a threaded cup 57 and a channel 58 which acts as a wire conduit. The transducer 55 has an outer thread which forms a threaded connection with the cup 57.

The housing 56 is bonded to the inner surface of the skin layer 52 around the periphery of the access panel 53, and the access panel 53 is bolted to the housing 56.

Although the invention has been described above with reference to one or more preferred embodiments, it will be appreciated that various changes or modifications may be made without departing from the scope of the invention as defined in the appended claims.

The invention claimed is:

1. An aircraft skin panel which is a wall of a fluid tank when in use, the skin panel comprising an inner layer and a skin layer with an outer surface which is an aerodynamic surface of an aircraft when in use; an ultrasonic gauge positioned between the skin layer and the inner layer; and an access panel in the skin layer which can be removed to gain access to the gauge from outside the tank.

2. The skin panel of claim 1 further comprising a core having a mass density lower than the inner layer and the skin layer, wherein the core is positioned between the inner layer and the skin layer.

3. The skin panel of claim 2 further comprising a signal wire connected to the ultrasonic gauge, wherein the signal wire is positioned between the inner and skin layers of the skin panel.

4. The skin panel of claim 3 further comprising a wire conduit positioned between the inner and skin layers of the skin panel.

5. The skin panel of claim 4 wherein the wire conduit surrounds the signal wire.

6. The skin panel of claim 4 wherein the wire conduit engages the inner layer and the skin layer.

7. The skin panel of claim 4 wherein the signal wire or the wire conduit is fitted into a hole or recess in the core.

8. The skin panel of claim 1 wherein the gauge comprises a gauge assembly comprising a transducer assembled with one or more fittings.

9. The skin panel of claim 2 wherein the gauge comprises an angled surface which engages the inner layer, and wherein the inner layer forms a ramp where it engages the angled surface.

10. The skin panel of claim 8 wherein the transducer is assembled with the one or more fittings by a threaded connection.

11. The skin panel of claim 2 wherein the gauge is fitted into a hole or recess in the core.

12. The skin panel of claim 2 wherein the gauge engages and is in direct contact with the inner layer and the skin layer.

13. The skin panel of claim 2 wherein the core comprises an array of air cells.

14. The skin panel of claim 2 wherein the core comprises a foam or honeycomb material.

15. The skin panel of claim 1 wherein the access panel is mounted to the ultrasonic gauge.

16. The skin panel of claim 15 wherein the access panel is mounted to the ultrasonic gauge by one or more removable fasteners.

17. The skin panel of claim 1 wherein the ultrasonic gauge engages an inner surface of the skin layer.

18. A method of manufacturing the aircraft skin panel of claim 2, the method comprising placing the core and the gauge on a first one of the layers, and then laying the other layer onto the core and the gauge.

19. An aircraft panel which is a wall of a fluid tank when in use, the panel comprising a skin layer with an outer surface which is an aerodynamic surface of an aircraft when in use, and an inner surface; a hole in the skin layer; an ultrasonic gauge assembly; and an access panel which fills the hole and can be removed to gain access to the ultrasonic gauge assembly from outside the tank, wherein the ultrasonic gauge assembly comprises an ultrasonic transducer, and a housing which is attached to the inner surface of the skin layer around a periphery of the access panel and houses the ultrasonic transducer, the housing comprising a channel which is configured to act as a wire conduit.

* * * * *